United States Patent [19]

Noddings

[11] Patent Number: 5,983,368
[45] Date of Patent: Nov. 9, 1999

[54] METHOD AND SYSTEM FOR FACILITATING HIERARCHICAL STORAGE MANAGEMENT (HSM) TESTING

[75] Inventor: Douglas Stephen Noddings, San Jose, Calif.

[73] Assignee: International Business Machines Corporation, Armonk, N.Y.

[21] Appl. No.: 08/918,427

[22] Filed: Aug. 26, 1997

[51] Int. Cl.$^6$ ................................................ G06F 11/00
[52] U.S. Cl. ................................................ 714/42; 714/32
[58] Field of Search .................................. 395/611, 620, 395/180, 182, 183, 185; 714/38, 1, 6, 42, 32; 711/165

[56] References Cited

U.S. PATENT DOCUMENTS

| | | | |
|---|---|---|---|
| 5,018,060 | 5/1991 | Gelb et al. | 364/200 |
| 5,367,698 | 11/1994 | Webber et al. | 712/1 |
| 5,557,740 | 9/1996 | Johnson et al. | 395/183.14 |
| 5,564,037 | 10/1996 | Lam | 395/488 |
| 5,579,507 | 11/1996 | Hosouchi et al. | 395/497.02 |
| 5,602,936 | 2/1997 | Green et al. | 382/140 |
| 5,608,865 | 3/1997 | Midgely et al. | 714/1 |
| 5,617,566 | 4/1997 | Malcolm | 395/620 |
| 5,623,696 | 4/1997 | Johnson et al. | 395/681 |
| 5,644,766 | 7/1997 | Coy et al. | 395/620 |
| 5,701,467 | 12/1997 | Freeston | 395/611 |
| 5,729,730 | 3/1998 | Wlaschin et al. | 395/603 |
| 5,822,780 | 10/1998 | Schutzman | 711/165 |

*Primary Examiner*—Joseph E. Palys
*Assistant Examiner*—Nguyen Xuan Nguyen
*Attorney, Agent, or Firm*—Sawyer & Associates; Noreen A. Krall

[57] ABSTRACT

System and method aspects for testing a hierarchical storage management (HSM) system extension of a data processing system are provided. In a system aspect, the system for testing includes a script file mechanism for providing serialized system calls from processes of at least a pseudo device driver of the data processing system, and a compiled test engine means for performing the serialized system calls of the script file. The system calls from processes further include parallel processes of a file system and a pseudo device driver. In a method aspect, the method includes providing a test engine compiled for at least one operating system platform of the data processing system, and performing a test script with the test engine for serializing system calls from parallel processes of the file system and pseudo device driver.

19 Claims, 2 Drawing Sheets

METHOD AND SYSTEM FOR FACILITATING HIERARCHICAL STORAGE MANAGEMENT (HSM) TESTING

FIELD OF THE INVENTION

The present invention relates generally to test facilities for a data processing system, and more particularly to an operating system independent, automated hierarchical storage management test facility.

BACKGROUND OF THE INVENTION

In some data processing systems, files are stored according to a hierarchical storage management (HSM) file system. For example, an HSM file system is often employed in systems with a version of the UNIX operating system. Typically, operating system HSM extensions are required to support the HSM file system. The specific functions required through the extensions often vary from one operating system implementation, e.g., one UNIX implementation, to another. For systems operating according to an implementation of the UNIX operating system, the extensions that provide the support normally include a pseudo device driver extension and virtual file system function.

Test facilities are often employed to monitor the functionality of the HSM file system extension to identify any possible problems or errors in the extension. In typical systems, testing takes the form of a black box facility. In the black box approach, the operating system extensions normally are not tested on an isolated basis. Rather, testing occurs as the rest of the system, e.g., background processes/daemons, etc., occur and in parallel with the performance of file system operations. In the multiprocessing environment supported by UNIX platforms, processes run concurrently without regard to one another. Difficulty in reproducing specific sequences of system calls across concurrent processes arises, since operating systems normally schedule system calls according to factors, including the other activity on the system, that are independent from the testing. Unfortunately, defects are therefore often difficult to reproduce, as they may be related to a particular sequence of system calls that the black box approach is unable to identify. Thus, the granularity of the testing is less than optimal for determining defects in the extensions supporting the HSM file system.

Accordingly, what is needed is a test facility that remains independent by capably exercising system call interfaces in any sequence and with any combination of parameters.

SUMMARY OF THE INVENTION

These needs are met through the present invention which provides method and system aspects for testing a hierarchical storage management (HSM) system extension of a data processing system are provided. In a system aspect, the system for testing includes a script file mechanism for providing serialized system calls from processes of at least a pseudo device driver of the data processing system, and a compiled test engine means for performing the serialized system calls of the script file. The system calls from processes further include parallel processes of a file system and a pseudo device driver. In a method aspect, the method includes providing a test engine compiled for at least one operating system platform of the data processing system, and performing a test script with the test engine for serializing system calls from parallel processes of the file system and pseudo device driver.

The test facility of the present invention efficiently supports implementations of operating system platforms and serializes system calls for parallel processes (and threads) affecting the file system and pseudo device driver. Further, through the test facility, better granularity of the system activity while achieving HSM functions is provided. Thus, problems associated with black box testing methods are readily overcome. These and other advantages of the aspects of the present invention will be more fully understood in conjunction with the following detailed description and accompanying drawings.

DESCRIPTION OF THE INVENTION

The present invention relates to testing of HSM file system extensions. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
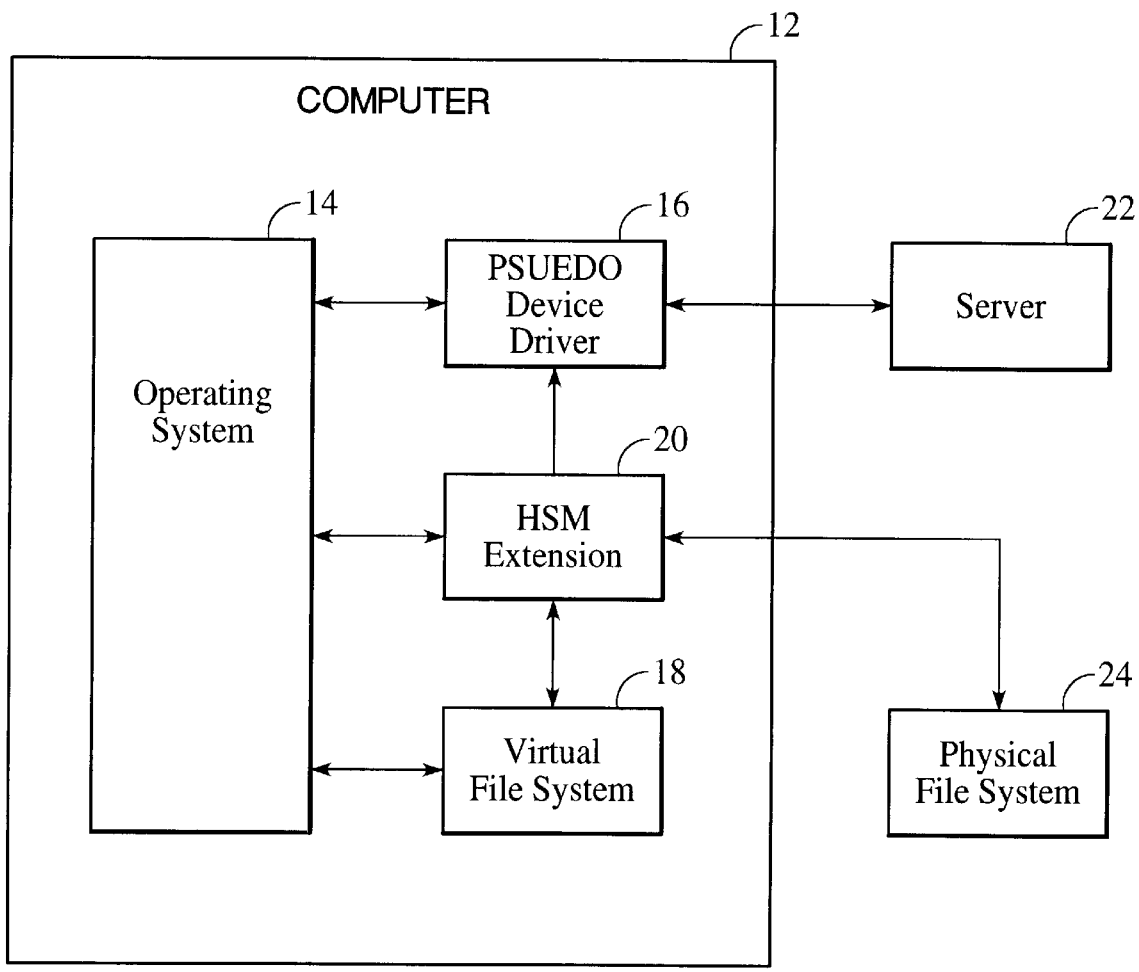
FIG. 1 illustrates a block diagram of a conventional operating system environment including an HSM file system extension.

FIG. 1 illustrates a data transfer system 10. The system 10 suitably includes a computer 12 with an associated operating system 14. In a preferred embodiment, the computer 12 is a type RISC System/6000 or HP 900 or SUN computer and the operating system 14 is an AIX, HP/UX, or Solaris operating system from IBM Corporation, New York. Also included in system 10 are pseudo device driver 16, virtual file system 18, HSM extension 20, device, e.g., ADSM server, 22, and physical file system 24.

Typically, file system operations or input/output control (ioctl) operations, e.g., basic system calls of open, read, write, and close, occur via the operating system 14 to the virtual file system 18. The virtual file system 18 suitably interacts with the physical file system 24 via the HSM extension 20 for each ioctl. With the typical black box test facilities, the granularity of the testing is limited to the level of these file system operations. However, other HSM commands, e.g., migrate and recall, also occur in parallel with the file system operations, but are not capable of being monitored by the typical black box testing approach.

By way of example, in operation, when a recall command is supplied by a user, i.e., a user opens a file and attempts to read the file, a read operation is suitably signalled to the virtual file system 18 from the operating system 14. The virtual file system 18 then passes the request to the HSM extension 20. When the HSM extension 20 determines that the file is not located on the physical file system 24, the HSM extension 20 proceeds to signal the pseudo device driver 16 to have an HSM daemon process retrieve the file from the server 22 to give the file back to the HSM extension 20. Once the HSM extension 20 gets the file back from the pseudo device driver 16, the HSM extension 20 suitably provides the file to the physical file system 24, which finally returns the file as the recall data. Thus, several processes occur within system 10 in performing HSM commands that normal black box testing is unable to scrutinize.

Figure 2:
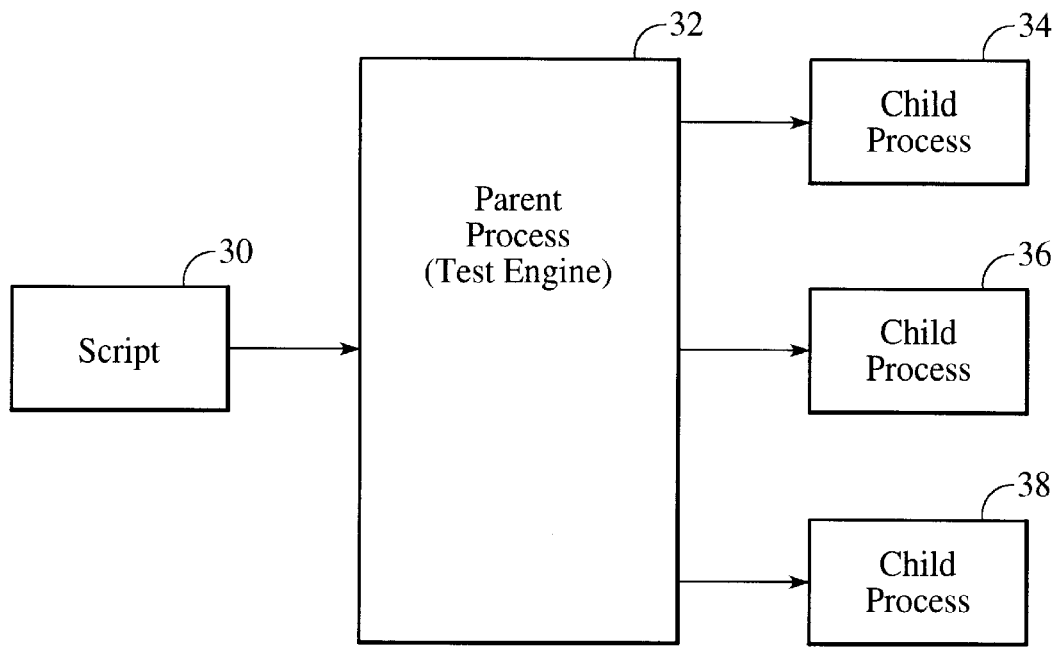
FIG. 2 illustrates a block diagram of test facility interaction in accordance with the present invention.

With the present invention, a test facility provides a script that capably achieves more accurate testing of HSM extensions and file system operations occurring in parallel in system 10, as described with reference to FIGS. 2 and 3. In a preferred embodiment, a script 30 provides a sequence of steps for a parent process 32, i.e., a test engine, to utilize for testing of parallel activities that may occur in the HSM file system. Preferably, the script is operating system independent by exercising HSM functions on all operating systems supported by system 10. Thus, HSM functions supported preferably include both file system operations and system call interfaces to the HSM pseudo device driver. This support suitably enables controlled execution of sequences of system calls associated with concurrent file system and HSM control functions. Further, preferably the script is provided via a suitable computer readable medium, e.g., a floppy disk, a hard disk, for the system 10, the details of which are well appreciated by those skilled in the art.

By way of example, the script 30 indicates to the parent process 32 given functions for a first child process 34, a second child process 36, and a third child process 38 in order to achieve a more realistic set of system activities for the test sequence. Thus, child process 34 suitably performs an input/output control (ioctl) operation to signal to the operating system 12 an initiation of a daemon to start reading a file into the server 22. The typical ioctls include open, read, write, and close. Child process 36 preferably in parallel initiates the performance of a file system operation, such as an open file operation. Thus, the virtual file system 18 would be activated. Child process 38 then suitably initiates as a daemon process with the server 22. Thus, the steps indicated by the script 30 for performance by the test engine/parent process 32 provides individual control in a selected sequence to better monitor the parallel activities of the system 10.

Figure 3:
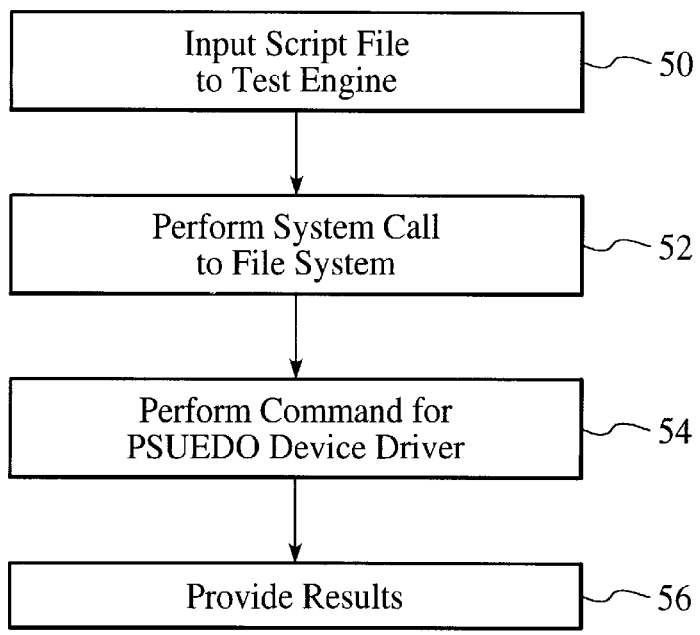
FIG. 3 illustrates a flow diagram of test facility provision in accordance with the present invention.

An overall flow diagram of the test facility provision in accordance with the present invention is illustrated in FIG. 3. The process begins with the input of script file (e.g., script file 30) to a test engine 32 (step 50). Since the test engine 32 is preferably already compiled over multiple platforms, the process continues with the performance of system calls on the file system, e.g., ioctl operations, such as open, read, etc., (step 52). The process continues with the performance of higher level commands, e.g., migrate and recall, for interaction with the pseudo device driver (step 54). As the sequence of commands provided by the test engine 32 are stepped through to achieve parallel processing in the file system and pseudo device driver, results of these steps are provided (step 56). Upon completion, the results from the steps processed via the test engine 32 appropriately reflect the parallel, multiprocessing behavior of the HSM file system extension.

With the present invention, improved testing over black box approaches is readily achieved. Problems associated with black box testing of operating system extensions, including the inability to track the random state of the pseudo device driver due to the manner of operating system scheduling of system calls, are overcome. Further, provision of a test engine in accordance with the present invention also avoids the normal procedure of providing the tests in shell script form, which does not control sequences of system calls to the pseudo device driver and rather, initiate a shell command that often results in several pseudo device driver system calls.

Thus, the test facility of the present invention provides scripts in a script language that dramatically simplifies system call logic, spans implementations of operating system platforms, and serializes system calls for parallel processes (and threads) affecting the file system and pseudo device driver. Further, the test engine processes the scripts as automated tests, and compiles and runs across operating systems. Additionally, reduced expenses for maintenance changes result through automatic application to all platforms for changes done in non-specific platform code.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for testing a hierarchical storage management, HSM, system extension of a data processing system, the system for testing comprising:
   script file means for providing serialized system calls from processes of at least a pseudo device driver of the data processing system; and
   compiled test engine means for performing the serialized system calls of the script file.

2. The system of claim 1 wherein the system calls from processes further comprise parallel processes of a file system and a pseudo device driver.

3. The system of claim 2 wherein the processes of a file system further comprise input/output control (ioctl) operations.

4. The system of claim 3 wherein the ioctl operations further comprise open, read, write, and close operations.

5. The system of claim 2 wherein the processes of a pseudo device driver further comprise recall and migrate processes.

6. The system of claim 2 wherein processes of a pseudo device driver further comprise interaction between the HSM extension and a remote server of the data processing system.

7. A method for testing a hierarchical storage management (HSM) system extension of a data processing system, the data processing system including a file system and a pseudo device driver, the method comprising:
   providing a test engine compiled for at least one operating system platform of the data processing system; and
   performing a test script with the test engine for serializing system calls from parallel processes of the file system and pseudo device driver.

8. The method of claim 7 wherein the step of performing further comprises processing the test script with the test engine as an automated test.

9. The method of claim 7 wherein a process of the file system further comprises an open operation.

10. The method of claim 7 wherein a process of the file system further comprises a read operation.

11. The method of claim 7 wherein a process of the file system further comprises a close operation.

12. The method of claim 7 wherein a process of the file system further comprises a write operation.

13. The method of claim 7 wherein a process of the pseudo device driver further comprises a migrate operation.

14. The method of claim 7 wherein the at least one operating system platform further comprises at least one UNIX operating system platform.

15. A method for testing a hierarchical storage management (HSM) system extension of a data processing system, the data processing system including a file system and a pseudo device driver, the method comprising:

providing a test engine compiled for at least one operating system platform of the data processing system; and performing a test script with the test engine for serializing system calls from parallel processes of the file system and pseudo device driver, a process of the pseudo device driver further comprising a recall operation.

16. A computer readable medium containing program instructions for testing a hierarchical storage management (HSM) system extension of a data processing system, the data processing system including a file system and a pseudo device driver, the program instructions comprising:

providing a test engine compiled for at least one operating system platform of the data processing system; and performing a test script with the test engine for serializing system calls from parallel processes of the file system and pseudo device driver.

17. The program instructions of claim 16 wherein a process of the file system further comprises an open, read, write, or close operation.

18. The program instructions of claim 16 wherein a process of the pseudo device driver further comprises a recall or migrate operation.

19. The program instructions of claim 16 wherein a process of a pseudo device driver further comprises interaction between the HSM extension and a remote server of the data processing system.

* * * * *